United States Patent Office 3,583,944
Patented June 8, 1971

3,583,944
INACTIVATING CARBOXYL END GROUPS IN POLYESTERS
Albert R. Sawaya, Akron, and Jack D. Hauenstein, Stow, Ohio, assignors to The Goodyear Tire & Rubber Company, Akron, Ohio
No Drawing. Filed Nov. 3, 1969, Ser. No. 873,695
Int. Cl. C08g 17/14
U.S. Cl. 260—75T                     16 Claims

ABSTRACT OF THE DISCLOSURE

The carboxyl number of polyesters is reduced by reacting the high polymer in comminuted film and fiber-form with a minor stabilizing quantity of certain cyclic and/or acyclic ketene acetals such as 2-methylene-1,3 dioxolane.

---

This invention relates to improved aromatic linear highly polymerized polyesters and copolyesters and to new and useful fibers and films formed therefrom. More particularly the present invention relates to polyesters and copolyesters containing combined terephthalic acid which are highly polymerized and have their terminal carboxyl groups inactivated by reaction with particular cyclic and/or acyclic ketene acetals.

The polyesters useful in accordance with the present invention are cold-drawing, linear, highly polymerized esters of terephthalic acid and glycols of the formula $$HO(CH_2)_nOH$$

where $n$ is an integer of from 2 to 10. The copolyesters used in this invention are ethylene terephthalate-ethylene isophthalate copolyesters as described in U.S. Pat. No. 2,965,613 to Milone et al.

In producing polyalkylene terephthalates there is involved the interaction of at least two molecular proportions of a glycol (preferably ethylene glycol) per molecular proportion of terephthalic acid with the splitting out of water. Subsequent heating of the resulting glycol ester of terephthalic acid at about 250° to 280° C. under 0.05 to 20 millimeters of mercury pressure absolute results in the production of high polymer with the splitting out of glycol which is removed from the reaction mixture.

Alternatively highly polymeric polyalkylene terephthalates may be produced by heating terephthalic acid bodies, such as ester-forming derivatives of terephthalic acid with at least one glycol. Suitable ester-forming derivatives are aliphatic or aromatic esters of terephthalic acid such as $C_1$ to $C_4$ alkyl esters and/or aryl esters such as those from phenol, cresols and the like. The preferred derivatives are methyl and ethyl terephthalates.

In this latter alternative procedure first there is a transesterification reaction (or ester interchange reaction) to low polymer with the evolution of alcohol. Subsequently, upon heating at about 250° to 260° C. under 0.05 to 20 millimeters of mercury absolute pressure there is a polycondensation reaction to high polymer with splitting out (and removal) of glycol. Each reaction is preferably catalyzed. Zinc diacetate and other known catalysts are employed to speed up the transesterification reaction and antimony oxide or other known catalysts are employed to promote the subsequent polycondensation reaction.

The preparation of ethylene terephthalate-ethylene isophthalate copolyesters is along lines previously described and is described in detail in U.S. Pat. 2,965,613 (supra).

Other linear aromatic polyester resins useful for the purposes of the invention include among others not only polyethylene terephthalate and copolyesters of ethylene terephthalate and ethylene isophthalate but also such polymers as cyclohexane dimethylol terephthalate, polyethylene-2,6-naphthalate and copolyesters of terephthalic acid which contain at least 75 mol percent of terephthalic acid.

In accordance with the present invention undegraded, light colored films and fibers of the above-mentioned polyester resins are produced and polyesters having a reduced number of carboxyl groups is obtained by reacting the cold-drawing highly polymeric material with a minor and stabilizing quantity, preferably about 0.01 to 5.0 weight percent based on polymer of at least one acyclic and/or cyclic ketene acetal of the formulas:

(a) 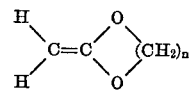

where $n$ is 2 to 4;

(b) 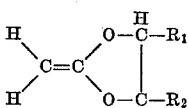

where $R_1$ and $R_2$ are hydrogen or a $C_1$ to $C_6$ alkyl group;

(c) 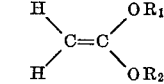

where $R_1$ and $R_2$ are $C_1$ to $C_{14}$ alkyl, aryl, aralkyl and/or alkaryl groups.

Typical ketone acetals, useful for the purposes of the present invention include among others 2-methylene-1,3, dioxolane, 2-methylene-1,3 dioxane, 2-methylene-4,5 dimethyl-1,3 dioxolane, 2-methylene 4-methyl-5-ethyl 1,3 dioxolane, ketene diethyl acetal, ketene dibutyl acetal, mixtures thereof, etc.

Reaction temperatures of from 10° to 50° C. (e.g. room temperature) may be used for reacting the acetal with the polymer, the reaction time advantageously being 0.1 to 50.0 hours, preferably 0.2 to 30 hours.

In order to more fully illustrate the invention, the following experimental data are given:

EXAMPLE

A poly(ethylene terephthalate) with an initial carboxyl content of 61.71 equivalents in $10^6$ grams was finely powdered (60 mesh) and swollen in tetrachloroethane for 12 hours at 55° C. To this was added 23 weight percent based on polymer of 2-methylene-1,3 dioxolane under an inert atmosphere (e.g. nitrogen). After a reaction period at room temperature of 2 to 24 hours (as indicated hereinafter) the powder was isolated by filtration, washed with ether and dried under one millimeter of mercury absolute. The following table shows the conditions of treatment and the results found.

TABLE I

| Concentration of dioxolane, ml./50 ml. tetrachloroethane | Reaction | | COOH eq. per $10^6$ gm. | Percent reduction of COOH |
|---|---|---|---|---|
| | Time (hours) | Temp., ° C. | | |
| 0 (Control) | | | 61.7 | |
| 0.5 | 24 | 25 | 19.8 | 68 |
| 0.5 | 2 | 55 | 16.6 | 73.1 |
| 0.5 | 24 | 55 | 10.8 | 82.6 |
| 2.0 | 24 | 55 | 1.65 | 97.3 |

Resort may be had to modification and variations of the disclosed embodiments of the invention without departing from the spirit of the invention or the scope of the appended claims.

What is claimed is:
1. A process or reducing the number of carboxylic end groups in linear aromatic polyester resins to lessen their degradation and lessen discoloration which comprises contacting said resin at a temperature of from about 10° to

50° C. for about 0.1 to 50.0 hours with about 0.01 to 5.0 weight percent based on polyester of at least one ketene acetal of the formulas:

(a) 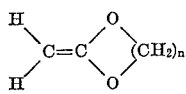

where $n$ is 2 to 4;

(b) 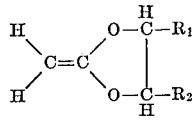

where $R_1$ and $R_2$ are selected from the group consisting of hydrogen and $C_1$ to $C_6$ alkyl radicals;

(c) 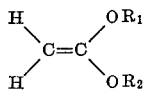

where $R_1$ and $R_2$ are $C_1$ to $C_{14}$ alkyl, aryl, aralkyl and alkaryl groups.

2. A process in accordance with claim 1 in which the polyester is a polymeric terephthalate-glycol containing condensation product.

3. A process in accordance with claim 1 in which the polyester is a copolyester.

4. A process in accordance with claim 1 in which the ketene acetal is selected from the group consisting of 2-methylene-1,3 dioxolane and 2-methylene 1,3 dioxane, and mixtures thereof.

5. A process in accordance with claim 4 in which the ketene acetal is 2-methyl-1,3 dioxolane.

6. A process in accordance with claim 4 in which the ketene acetal is 2-methylene-4,5-dimethyl-1,3 dioxolane.

7. A process in accordance with claim 4 in which the ketene acetal is ketene dimethyl acetal.

8. A process in accordance with claim 4 in which the ketene acetal is ketene dicyclohexyl acetal.

9. An improved polyester product produced by the process of claim 1.

10. An improved polyester product produced by the process of claim 2.

11. An improved polyester product produced by the process of claim 3.

12. An improved polyester product produced by the process of claim 4.

13. The polyester product of claim 9 in the form of a fiber which is able to be cold drawn.

14. The polyester product of claim 10 in the form of a member selected from the group consisting of fibers and films.

15. The polyester product of claim 11 in the form of a member selected from the group consisting of fibers and films.

16. The polyester product of claim 12 in the form of a member selected from the group consisting of fibers and films.

References Cited
UNITED STATES PATENTS

| | | | |
|---|---|---|---|
| 2,723,286 | 11/1955 | Young et al. | 260—485 |
| 2,863,854 | 12/1958 | Wilson | 260—75 |
| 3,300,447 | 1/1967 | Thoma et al. | 260—75 |
| 3,419,580 | 12/1968 | Kuryla | 260—347.8 |
| 3,431,281 | 3/1969 | Sawaya | 260—340.9 |

FOREIGN PATENTS 348,552  10/1960  Switzerland.

MELVIN GOLDSTEIN, Primary Examiner